United States Patent [19]

Davies

[11] 3,858,958

[45] Jan. 7, 1975

[54] METHODS AND APPARATUS FOR FORMING ELECTRICAL CONNECTIONS

[75] Inventor: Dennis Davies, Marple, England

[73] Assignee: International Computers Limited, London, England

[22] Filed: Oct. 29, 1973

[21] Appl. No.: 410,598

[30] Foreign Application Priority Data

Oct. 31, 1972 Great Britain .................... 50040/72

[52] U.S. Cl. .......... 339/17 LM, 317/101, 339/59 M

[51] Int. Cl. ......................... H01r 13/54, H05k 1/04

[58] Field of Search ............. 339/17, 75, 74, 59, 60, 339/61, 174, 99, 97, 218; 317/101

[56] References Cited

UNITED STATES PATENTS

| | | | |
|---|---|---|---|
| 3,173,732 | 3/1965 | James | 339/17 LM |
| 3,551,750 | 12/1970 | Sterling | 339/17 LM |
| 3,638,163 | 1/1972 | Loosime | 339/17 M |
| 3,721,940 | 3/1973 | Michel et al. | 339/17 F |
| 3,795,037 | 3/1974 | Luttmer | 339/59 M X |
| 3,795,884 | 3/1974 | Kotaka | 339/17 LM |

*Primary Examiner*—Roy D. Frazier
*Assistant Examiner*—Terrell P. Lewis
*Attorney, Agent, or Firm*—Misegades, Douglas & Levy

[57] ABSTRACT

A connector for use with printed circuit boards is described. For use with boards having contacts arranged, for example, along an edge, the connector has a number of spaced apart flexible conductive rings supported on a common elastomeric core. The rings make contact with the board contacts and, through corresponding contacts of at least two boards, provide external interconnections between boards. The connectors may be supported by an internal support, such as a reinforcing rod, or they may be located by, for example, recesses formed in their ends. The rings are preferably very thin walled to provide flexibility, the necessary mechanical support for the rings being provided by the core. To produce rings having a sufficiently thin wall, a thicker-walled tube may be internally etched to reduce the wall thickness to the required dimension.

2 Claims, 6 Drawing Figures

METHODS AND APPARATUS FOR FORMING ELECTRICAL CONNECTIONS

BACKGROUND OF THE INVENTION

1. Field of the Invention

This invention relates to a method and apparatus for making electrical interconnections.

2. Description of the Prior Art

It is common practice to interconnect electronic units, such as integrated circuits, by means of printed circuits which are typically carried on insulating boards. In complex apparatus, such as a computer or a radar set, it is usual to use a number of such boards and the problem then arises of interconnecting the boards. This may be done, for example, by providing a row of contacts along one edge of each board, so that each board may be plugged into a matching socket which is mounted on a mother board. The necessary interconnection wiring is then provided between the sockets. The sockets have to be built with care and accuracy to provide a reliable contact with the boards, and the cost of providing interconnections by this method can easily become a substantial part of the total cost of the system.

Alternatively, the interconnections can be made in a permanent manner by means of soldered or welded joints. This may be less costly in initial assembly, but effecting any repair at a later date is both difficult and costly.

It is clear that there is a need for a method of providing interconnections between boards which allows easy separation of the boards for the purpose of repair and yet avoids the high cost of the plug and socket type of assembly.

SUMMARY OF THE INVENTION

According to one aspect of the invention an electrical connector includes a plurality of flexible thin-walled electrically conductive rings spaced apart in the direction of their common cylindrical axis, all the rings being secured to a common core of elastomeric material. The electrical connector may then be supported, for example in a frame, so that the rings are located in alignment respectively with contacts of a group of circuit connections.

According to another aspect of the invention a method of making an electrical connector includes the step of forming a plurality of flexible thin-walled electrically conductive rings at spaced apart positions along and secured to a common core of elastomeric material. The rings may be formed by etching from a hollow cylinder into which the core has previously been bonded. The hollow cylinder may be formed by etching the interior wall of a metallic tube initially having a wall thicker than is required until the required wall thickness is obtained.

Embodiment of the invention will now be described, by way of example, with reference to the accompanying drawings, in which;

DESCRIPTION OF THE PREFERRED EMBODIMENTS

Figure 1:
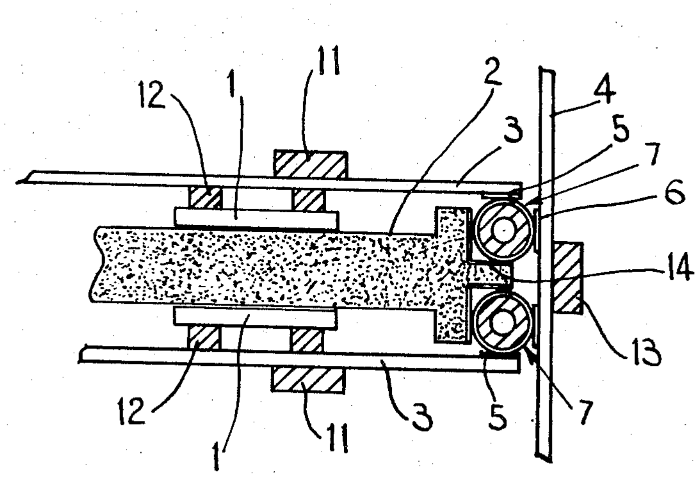
FIG. 1 is a partial sectional view of apparatus embodying the invention.

Referring now to FIG. 1, an arrangement for supporting and interconnecting microcircuits 1 is shown. A number of the microcircuits 1 is mounted on a liquid cooled heat sink 2. Each micro-circuit has a number of contact pads on the surface facing away from the heat sink to provide connections for input and output signals and power supplies. Electrical connections are made from these contact pads to corresponding pads on one of a pair of multi-layer printed circuit boards 3. The connections between the pads on the micro-circuits and on the circuit boards 3 are preferably made by an elastomeric connectors 12 which are described in our co-pending British Patent Applications No's. 21609/70 and 45196/70. Briefly, such connectors consist of a block of an insulating material, such as silicone rubber, in which a multitude of tiny springy contact members are embedded. These springs provide electrical connections from one face of the block to the opposite face, so that placing the block between the two sets of pads and applying pressure effects the desired interconnection. Since the interconnection is provided by pressure, the pressure may be released to allow the assembly to be taken apart, repaired and re-assembled. The upper board 3 will provide the connections which are necessary to form larger circuit units from the microcircuits which are located on the upper face of the heat sink. However, in the case of complex apparatus referred to earlier, it is still necessary to make connections between the upper board 3, the lower board 3 and other similar boards (not shown), as noted above. These additional connections are provided in the present example by a vertical printed circuit board 4.

Each board 3 is provided with a group of contact pads 5 spaced part along the edge which is adjacent to the board 4. The board 4 is provided with a corresponding group of pads 6 for each of the boards 3. The connection between the pads 5 and the corresponding pads 6 is effected by a cylindrical elastomeric connector 7. The connector consists of a central rigid rod 8 (FIG. 2) which is surrounded by a cylinder 9 of a suitable insulating elastomer, such as silicon rubber or neoprene. A group of conductive rings 10 are formed on the outer surface of the elastomer.

One convenient method of forming such a connector is to position the rod 8 centrally within a thin walled phosphor bronze tube. The space within the tube is then filled with the elastomer, in liquid form, which is allowed to set. The outside of the tube is coated with a conventional resist, exposed to the desired pattern, developed to remove the unwanted resist and then etched to remove the unwanted parts of the tube to leave the rings 10. The rings may be plated with another metal, such as gold. This form of construction is useful when the connector is of substantial diameter and length. The rod 8 provides a useful reinforcement and it may extend beyond the ends of the elastomer to provide support portions which may be used for locating and for securing the connector in position.

However, if the connector is less than, say, 0.25 inch in diameter, it is difficult to simultaneously achieve the necessary stiffness in the rod 8 and the necessary resilience in the elastomer 9. Consequently, it is preferable to omit the rod 8. A solid cylinder of elastomer may be pulled through a phosphor bronze tube, which is then etched as described above. The elastomer or the interior of the tube may be coated with an adhesive to bond the tube to the elastomer. A closed cell foam material is particularly useful for the elastomer because it has less tendency to acquire a set when subjected to pressure for long periods.

The rings 10 on the connector are so positioned that at least one ring is aligned with each pair of pads in the groups 5 and 6. Typically, the rings might be about 0.02 inch wide and spaced on 0.050 inch centres. The relative spacing of the rings and pads may be such that at least some pairs of pads are connected by two or more rings, to increase the current carrying capacity of the connection, for example.

The production of the connectors is simplified if they can be produced to a standard specification for ring width, spacing, thickness, etc. However, it may be desirable to alter any one or more of such parameters in respect of some of the rings on a connector. This alteration may be to obtain particular current carrying capacity, impedance or other criteria for certain of the connections. The pattern is determined by the masking during exposure in the process which has been described above. Difference in thickness of the rings may be obtained by additional partial etching, or by electroplating, of selected rings.

Figure 3:
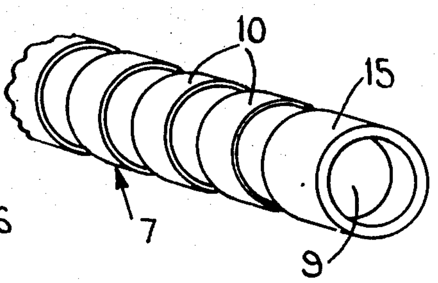
FIG. 3 is a partial view of an alternative form of connector.

Alternative support and locating arrangements are required when the central rod 8 is omitted. As shown in FIG. 3, for example, the connector may be provided with an additional ring 15 at each end which partly extends beyond the end of the elastomer 9 and is sufficiently thick to be relatively rigid. To support this form of connector, two small plastic mouldings may be provided, each of which has a cylindrical projection to fit within the end ring 15 of the connector.

Figure 2:
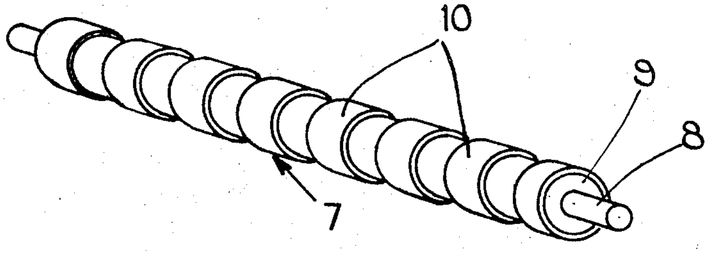
FIG. 2 is a view of one form of electrical connector assembly.

Similar plastic mouldings, but with holes or recesses to take the rod ends 8 may be provided for supporting the form of connector shown in FIG. 2. The supporting mouldings for either form of connector may have pegs to put into holes or slots in the printed circuit boards, such as the boards 3 or 4, or they may be secured by other means such as screws.

As noted above, the cylinder of elastomer is preferably bonded by an adhesive to the tube so that, after etching, the rings are securely attached to the elastomeric core 9. However, since liquid elastomers tend to shrink during curing, it is preferred to cast the core initially in an oversize tube which is coated with a separating compound so that the cured elastomeric cylinder, which is to form the core 9, may be removed and then inserted in a tube of the desired size.

Referring once again to FIG. 1, the end portions of the heat sink 2 are covered by a thin layer of insulating material 14, such as mylar or polyimide, to prevent a short circuit between the rings 10 and the end of the heat sink. Alternatively, insulating blocks, shaped to support the connectors 7 may be provided at the ends of the heat sink. Pressure members, indicated diagramatically at 11, are necessary to ensure the proper operation of the elastomeric connectors 12. The pressure exerted by these members 11 and the stiffnenss of the boards 3 may compress the connector 7 sufficiently to ensure good contact between the rings 10 and the pads 5 and 6. Additionally, or alternatively, a pressure member 13 may be used to apply pressure to the board 4. It will be understood that the plurality of pairs of boards 3 and the pair of boards 4, at opposite ends of the boards 3 are all supported in essentially conventional supporting frame (not shown) to form a stack. The boards have a limited amount of freedom of movement with respect to the frame to the extent necessary to allow the operation of the pressure members 11 and 13.

Figure 4:
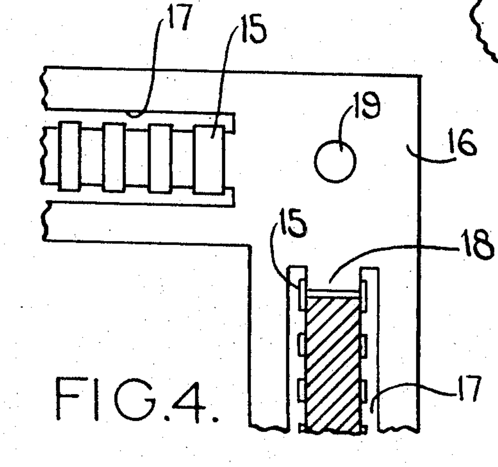
FIG. 4 is a view, partly in section, of part of an assembly carrying connectors.

In an alternative structure when the heat sink is not required, a succession of parallel boards, such as the boards 3, may be interconnected by a simple frame supporting only single connectors aligned with the board edge or edges. For example, as shown in FIG. 4 a frame 16 of insulating material is provided with a slot 17 extending parallel to each edge which is to accomodate a connector. The ends of the slot 17 are formed, for example with a protruding portion 18, to engage the supporting means (in the case illustrated, the recess within the additional rings 15). In use the frames 16 are interleaved with the boards, such as 3, to make a multilayer "sandwich". Registration holes 19 are preferably provided in the frame 16 and the boards in which pins or bolts may be inserted to align the boards and frames. Where bolts are provided through the registration holes, they may also be used to provide the necessary pressure to ensure a good electrical connection between the rings 10 and the matching pads.

Figure 5:
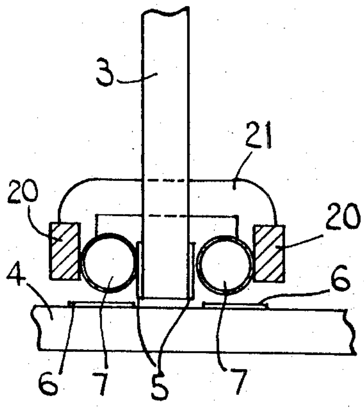
FIG. 5 is a view, partly in section, of an assembly using electrical connectors.

In a further form of construction, illustrated in FIG. 5, the connectors 7 may be used in a rather different way to provide connections between individual boards, such as 3, and a mother board, such as 4, in those cases where a heat sink of the kind shown in FIG. 1 is not required. In this case a pair of connectors 7, one on either side of a board 3, are each held between the board 3 and a cage side 20. The sides 20 are supported at intervals by bridge pieces 21 which slide, vertically as shown in the drawing, in slots in the boards 3. The bridge pieces 21 are moved in a direction away from the board 4, carrying the cage sides 20 with them. This movement of the cage sides 20 rolls the connectors 7 clear of the board 4 to permit the withdrawal of the board 3 from the board 4. When the board 3 has been replaced in position the bridge pieces 21 are moved towards the board 4, rolling the connectors in a downward direction as shown in the drawing, into contact with the pads 6. In practice, the cage sides 20 are spaced apart by a distance which compresses the rings of the connectors slightly to provide the required contact pressure to the pads 5 of the board 3. The bridge pieces 21 are, in practice, latched in their operated position to maintain the connectors 7 with sufficient contact pressure on the pads 6.

In all the arrangements described above, it will be seen that the inter-board circuit connections are provided by connectors 7 which consists essentially of a number of thin-walled conductive rings spaced apart along a common elastomeric core. The rings are sufficiently thin to be flexible, thus ensuring that they may be so distorted that all of them make good electrical contact with pads on the boards. The elastomeric core is chosen to provide sufficient support to the rings so that adequate contact pressures may be maintained. It has been found that to achieve a good compromise between the distortion required from individual rings and sufficient stiffness to provide adequate contact pressure, the rings must be made relatively flimsy so that the load is taken primarily by the core. It is therefore desirable to produce the rings from a thinner-walled tube than is normally commercially available, since such tube is susceptible to mechanical damage in handling. However, commercially available tube usually has an outer surface whose accuracy of profile and freedom from defects is highly desirable. Accordingly to retain this outer surface it is proposed to produce the required thin-walled tube from which the rings are to be etched by reducing the tube wall thickness from the inside of the tube bore.

Figure 6:
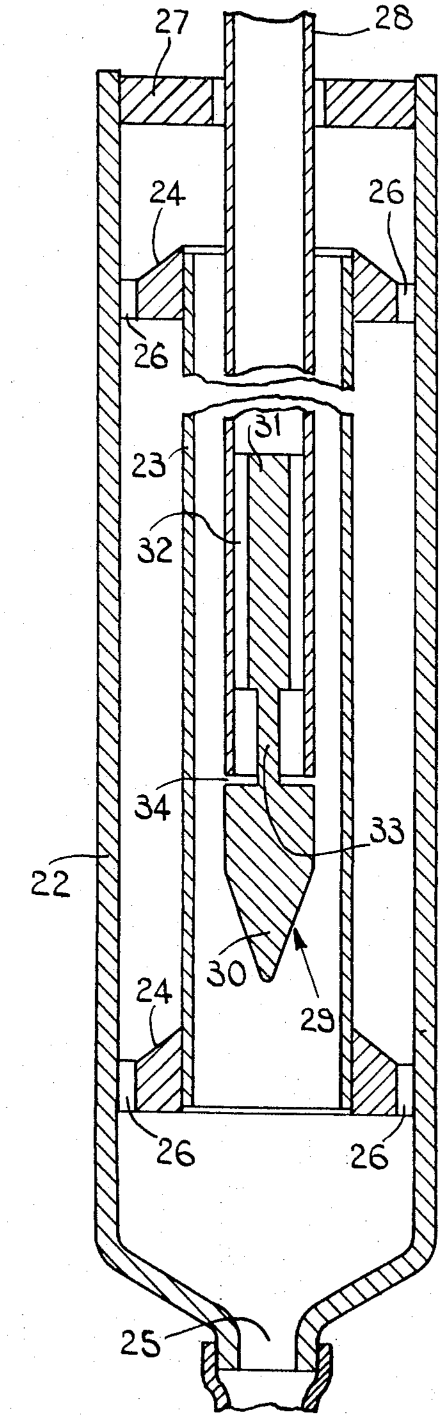
FIG. 6 is a sectional view of part of an etching apparatus.

FIG. 6 is a sectional view of an apparatus for etching the inner surface of a tube to reduce the tube wall thickness. An outer container 22, which is conveniently of glass, holds the tube 23 whose wall is to be etched in a pair of spacers 24. The container 22 is mounted so that the axis of the tube 23 is vertical, and an outlet drain 25 is provided at the lower end. The spacers 24 are made of a synthetic plastic material which will support the tube 23 by gripping both the tube 23 and the interior of the container 22. The spacers 24 are so shaped as to throw any etchant falling on them towards the wall of the container 22 and have holes 26 at their peripheries to allow surplus etchant to run down the inner wall of the container 22.

The upper end of the container 22 is closed by an end plate 27 which has a central hole to support and provide a bearing for a spray head tube 28. A spray head is formed at the lower end of tube 28 by the insertion into the tube of a nose piece 29. The nose piece 29 has a projecting portion 30 extending from the tube 28, and a portion of smaller diameter 31 set into the tube 28. The portion 31 has peripheral slots 32 extending axially from its upper end to a turned-down portion 33 immediately above the portion 30. The nose piece 29 is inserted into the tube 28 sufficiently far to leave a gap 34 between the portion 30 and the end of the tube 28, the gap 34 communicating with a chamber formed within the tube 28 by the turned down portion 33. In use etchant is pumped down through the tube 28 to flow along the slots 32 into the chamber and out through the gap 34 in the form of a fine spray. The tube 23 is oscillated up and down to cause the spray of etchant to impinge upon the interior wall of the tube 23 throughout its length. The movement of the tube 28 is sufficient so that the etchant spray is outside the ends of the tube 23 at the end of each strobe of movement, and the speed of movement of the spray while within the tube 23 is substantially constant. In this way the wall thickness of the tube 23 may be reduced substantially evenly to produce a thin-walled tube whose wall thickness is accurately controllable. A pre-cast elastomeric core may then be inserted and bonded into the tube so formed prior to the etching step described earlier.

It will also be understood that the connector 7 may be produced in other ways than that which has been described above. For example, there are well established processes in the field of printed circuit production for forming conductive areas on the surface of insulators. These processes, one example of which is electroless plating, may be used to form the required conductive areas on the surface of a suitably shaped piece of elastomer.

The connector may be rectangular, or oval, in cross section, for example, instead of circular. The rings forming the conductive areas 10 may actually be only segments, i.e. the rings may not be quite complete about the circumference of the elastomer, and may extend only as far as is necessary to provide contact with, and a connection between, the pads 5 and 6. This form of construction renders unnecessary the insulation layer 14. Alternatively, the layer 14 may be retained and the part of the surface of the elastomer which is not covered by the incomplete rings may be used to carry conductive tracks which link selected segments to provide an additional level of interconnection.

The boards 3 and 4 may be conventional single or double sided printed circuit boards, or they may be multi-layer boards, depending upon the density of interconnection which is required.

I claim:

1. An electrical connector for establishing electrical connections with a group of circuit terminations including a substantially cylindrical core of elastomeric material having two ends;

a plurality of rings each in the form of a hollow cylinder having an interior wall, the plurality including:

a number of flexible thin-walled electrically conductive rings all lying intermediate the ends of the core and being spaced apart axially therealong; and a further pair of rings, one at each end of the core, the rings of the pair each extending beyond the respective end of the core to form with the core a locating recess at each end thereof;

means securing the rings to the core including an adhesive layer to bond a part of the cylindrical surface of the core to the interior walls of the rings; and means for supporting the core including a frame arranged to engage with the locating recesses at each end of the core, the frame being positioned with respect to that group of circuit laminations with which connection is required, to maintain alignment of the conductive rings with the terminations of the group respectively.

2. An electrical connector as claimed in claim 1 in which the supporting means includes a rod passing axially through the core and projecting from each end thereof; and said frame is arranged to engage the rod at each end of the core, the frame being positioned with respect to the circuit connection group to maintain the alignment of the rings.

* * * * *